United States Patent [19]

Askman et al.

[11] 4,340,612
[45] Jul. 20, 1982

[54] PROCESS FOR SPINNING FISH PROTEINS

[75] Inventors: Lars Askman, Marysville, Ohio; Pierre Wetzel, Vevey; Alain Isely, Lausanne, both of Switzerland

[73] Assignee: Societe d'Assistance Technique pour Produits Nestle S.A., Lausanne, Switzerland

[21] Appl. No.: 245,999

[22] Filed: Mar. 20, 1981

[30] Foreign Application Priority Data

Mar. 31, 1980 [CH] Switzerland ........................ 2521/80

[51] Int. Cl.$^3$ ................................................. A23J 3/00
[52] U.S. Cl. .................................... 426/276; 426/657; 426/516; 426/802
[58] Field of Search ................ 426/276, 657, 516, 802

[56] References Cited

U.S. PATENT DOCUMENTS 3,210,195 10/1965 Kjelson et al. .................. 426/802 X
3,812,267 5/1974 Atkinson ......................... 426/657 X
3,843,803 10/1974 Yano et al. ...................... 426/276 X
3,889,010 6/1975 Brouwer .......................... 426/802 X
4,277,513 7/1981 Rufer et al. ..................... 426/657 X Primary Examiner—Robert A. Yoncoskie
Attorney, Agent, or Firm—Vogt & O'Donnell

[57] ABSTRACT

The present invention provides a process for preparing high nutritive fibres from fish proteins which comprises grinding whole fish or fish pieces in the presence of water and then adding alkali to the ground fish. The alkali/fish mixture is then heated and cooled and the cooled mixture is then passed through a colloid mill thereby eliminating solid particles to obtain a protein solution. The solution is then injected through a spinneret into an aqueous acid medium causing the coagulation of the proteins into fibres. The fibres are then washed, set by heating and then neutralized. The fibres obtained by this process are also described.

11 Claims, No Drawings

PROCESS FOR SPINNING FISH PROTEINS

This invention relates to a process for spinning fish proteins.

There are several known so-called "spinning" processes which all have in common a first step, in which an aqueous alkaline medium containing proteins is prepared, and a second step in which this aqueous alkaline medium is injected through an spinneret into an aqueous acid medium. The proteins then coagulate in the form of fibres.

These processes have been applied with some success on a technological level to vegetable proteins, such as soya proteins, from a vegetable material concentrated in proteins which is called a "meal", "concentrate" or "isolate", according to its protein concentration. In other words, the vegetable material in question must have been subjected to preliminary operations which add considerably to the cost of the spun product and reduce the nutritive value thereof.

These spinning processes have also been applied to animal proteins, such as fish proteins. In this case, too, it is advisable to start out from a material concentrated in proteins, such as meal. Under these conditions, the end products are relatively expensive and are not entitled to be called "pure fish" or "100% fish". In addition, spinning is only possible using additives, such as fatty acids or alginates.

By contrast, the present invention permits fish proteins to be spun from whole fish or pieces of fish without any need for additives to be used. The fish may therefore be directly used as it is caught or as it comes from filleting or canning factories. This result is made possible by a series of specific working conditions during preparation of the alkaline medium to be spun and of the acid coagulation medium.

The present invention provides a process for preparing fibres from fish proteins which comprises successively:

(a) grinding whole fish or fish pieces in the presence of water, the water to fish ratio being 0.7:1 to 2.5:1 by weight, (b) adding alkali to the ground fish in an alkali to fish ratio of 0.5:1 to 1.5:1 by weight based on dry matter, (c) heating the alkali/fish mixture of step (b) to a temperature of 60° to 100° C. for 0.5 to 3 minutes, (d) cooling the mixture of step (c) to a temperature of 35° to 60° C., (e) passing the cooled mixture of step (d) through a colloid mill, eliminating solid particles and optionally concentrating to obtain a protein solution having a dry matter content of 6 to 10% by weight, (f) injecting the alkaline solution of step (e) through a spinneret into an aqueous acid medium having a pH of 0.7 to 0.9 and an ionic strength of 2.0 to 2.2 thereby to coagulate the proteins to fibres, (g) washing the fibres of step (f), (h) setting the fibres of step (g) by heating, and (i) neutralising the fibres.

Unless the conditions specified above are observed, the fish proteins will tend to form non-spunable protein-containing gels at the concentration required for spinning. In this respect, their behaviour is far different from that a soya proteins.

The starting fish may be in the form of whole fish, above all in the case of small fish, or pieces of fish and advantageously filleting residues or even scraps also containing the bones, the head and the skin.

For the convenience of the description, the various successive operations involved in the process according to the invention are presented hereinafter in the form of titled sections.

GRINDING

The whole fish or pieces of fish is/are ground, advantageously to dimensions of the order of 1 to 8 mm, with addition of water during grinding. The water/fish dilution ratio, amounting to from 0.7:1 to 2.5:1, is preferably from 1.0:1 to 1.5:1, these dilution ratios ensuring the optimal quantity of water for the remaining operations. A dispersion is thus obtained.

SOLUBILISATION

For this operation, in which the proteins are dissolved in alkaline medium, as alkali, such as sodium hydroxide or mixtures of sodium and potassium hydroxide, preferably in the form of a solution, is added to the dispersion, advantageously at a temperature of from 10° to 20° C., in an alkali-to-fish ratio of from 0.5:1 to 1.5:1. Ratios such as these allow the required pH values in the range from 10 to 14 to be obtained without having an excess of alkali. After the addition, the mixture is heated briefly (for 0.5 to 3 minutes, typically 1 minute) to a temperature in the range from 60° to 100° C. and advantageously to 95° C. by any means, for example in a scraped-surface heat exchanger or best by the injection of steam. The fish proteins are redissolved.

CENTRIFUGING

The object of this operation is to separate the substantially or completely undissolved materials, such as the bones, the skin, the heads and the viscera. It is carried out preferably after the temperature has been reduced to from 40° to 50° C. A protein solution free from undissolved materials is thus obtained.

DEAERATION/CONCENTRATION

The solution obtained now has to be deaerated before spinning so as to remove bubbles of air which could interfere with the remaining operations and to adjust the viscosity of the solution within suitable limits, preferably from 10,000 to 30,000 cps, as measured at 25° to 40° C. The solution then has the required dry matter content, i.e. from 6 to 10% and preferably around 9%. If necessary, the solution is refiltered, for example on candle filters.

SPINNING

The aqueous medium, which has a pH from 10 to 14 and advantageously from 10 to 13, is injected through a spinneret into an acid bath having a pH of from 0.7 to 0.9. This acid bath contains a food-grade acid, such as acetic acid, phosphoric acid or, preferably, hydrochloric acid. This medium also contains salt in a high concentration of from 7 to 15% by weight. The ionic strength of the acid medium is thus from 2 to 2.2. The presence of salt in a high concentration is essential for allowing optimum coagulation by reduction of the pH of the isoelectric point of the fish proteins from its natural value of 5 to a value of from 3 to 3.5 and a certain dehydration of the fibres obtained by osmotic pressure. Fibres of fish proteins having a pH in the range from 4 to 4.2 are thus obtained. A pH above 5 would give fragile fibres whilst a pH below 3.5 would involve considerable losses of proteins by redissolution during subsequent washing.

The process according to the invention may be carried out particularly simply. Adjustment of the pH of the acid medium, which has to remain as stable as possible, is advantageously subordinated to measurement of the pH of the liquid expelled by the fibres when they are drained. The salt concentration is continuously monitored by measurement of the density which is not affected by the pH. A vibrating feeder automatically regulates the addition of salt.

In one advantageous variant, above all if the starting material consists mostly of heads as well as skin, the aqueous alkaline medium is treated before spinning with active carbon for decolouration. A treatment such as this may also be useful when the alkaline medium is used several times, that is to say when the operations are continuous and when this medium is kept constant in volume and composition during its consumption by the addition of fish and fresh alkali. In this case, the medium is if necessary passed over active carbon to keep it an acceptable colour.

WASHING/HEAT TREATMENT/NEUTRALISATION

The fibres obtained undergo additional treatments intended to provide them with gustatory and mechanical properties corresponding to the application envisaged. Thus, the fibres are liberally washed with water to reduce their salt content to from 2 to 5% by weight, based on dry matter. After washing, the fibres are subjected to a heat treatment to provide them with greater stability during neutralisation. This treatment is necessary for stabilising the fibres by fixing their structure so as to reduce their resolubilisation during the subsequent neutralisation treatment. Any such resolubilisation would be prejudicial to the yield and mechanical stability of the fibres. To this end, the fibres are continuously immersed for 10 to 15 minutes in a tank containing water at 50° to 75° C. They are then neutralised to a pH of from 6 to 6.8 by brief (3 to 10 secs.) immersion in a buffer solution, for example a solution of sodium bicarbonate containing sodium hydroxide. The same result is obtained by immersing the fibres for a longer period (5 to 10 minutes) in a buffer based on monosodium phosphate. Finally, the fibres are dried without heating.

The fibres obtained have remarkable mechanical properties which make them particularly suitable for the applications mentioned hereinafter. After coagulation and without neutralisation, the fibre with a pH of 4.2 is hard and elastic. After neutralisation to a pH of 6, this fibre is softer and has a high capacity for rehydration. For example, for a bundle of 5000 fibres, breaking loads varying from 700 to 1700 g per sample have been measured for an elongation of from 75 to 150%.

Even more remarkably, these fibres have a P.E.R. (protein efficiency ratio) of about 3.8. In other words, the fibres have a higher nutritive value than casein (P.E.R. = 3.2) which nevertheless is considered to be a yardstick in the field in question.

The colour of the fibres varies from white to grey, depending on whether or not the skins and the heads have been used. Their flavour is similar to that of the starting fish.

The fibres may be used as such, for example by rolling them up and steeping them in an flavoured vinegar solution. A product resembling "rollmops" is obtained in this way. The fibres may also be used for strenghening texture in a quantity of from 20 to 40% of fibres, for example in products of the fish stick type. In addition, after they have been cut and correctly flavoured and cooked, the fibres represent excellent substitutes for crustaceans.

The process according to the invention is illustrated by the following Examples in which the percentages quoted represent percentages by weight.

EXAMPLE 1

Fish scraps are introduced into a mill equipped with a grid having small (3 mm) holes and at the same time diluted with water in a ratio by weight of water to fish of 1.2:1. Sodium hydroxide is then added in a quantity corresponding to a ratio by weight of alkali to proteins of approximately 0.1:1 based on dry matter. The sodium hydroxide is added in the form of a 10% by weight solution.

The resulting mixture is then heated by the injection of steam for 1 minute to a temperature of 95° C., subsequently cooled to 50° C. and then passed through a colloid mill.

It is then introduced into a centrifuge to eliminate the solid impurities, followed by concentration in vacuo in a scraped surface evaporator to form a medium to be spun having a dry matter concentration of the order of 9%. Apart from concentration, this operation also effects deaeration of the medium to prevent bubbles of air from seriously interfering with the actual spinning process. This aqueous alkaline medium, cooled to 30° C. and having a pH of 12.7, is then injected through nozzles into an aqueous hydrochloric acid medium having a pH of 0.9 and containing sodium chloride in a quantity of 12% by weight.

The nozzle used is a die having 2500 holes each 140 nm (millimicron) in diameter. Under these conditions, the distance which the fibres travel in the acid medium is of the order of 10 to 13 cm.

The pH and salt content of this acid medium are continuously measured to enable any deviation to be immediately corrected. The sodium chloride concentration is measured by continuous monitoring of the density by the vibrating tube method. The concentration of hydrochloric acid is indirectly measured by monitoring the pH of the liquid expelled from the fibres on leaving the bath.

The fibres thus formed, having left the acid coagulation medium and been roughly dried without heating, are washed in an apparatus of the "shower" type and are then continuously immersed for 10 to 15 minutes in a tank containing water at 60° C. They are then dipped for 5 seconds in a solution of sodium bicarbonate and sodium hydroxide of which the bicarbonate concentration (0.1% by weight) and the pH value (8.2) are kept constant. The pH of the fibres then moves to 6.3. The fibres combined with one another to form bundles are then wound onto a drum and undergo natural exudation which adjusts their equilibrium dry matter content to approximately 20%.

These fibres have a relatively soft texture and a high capacity for rehydration. They are considerably softer than the same fibres at pH 4.2, i.e. before neutralisation in a bath of sodium bicarbonate. This relative softness is a factor which contributes towards a pleasant feeling on the palate.

The P.E.R. is excellent, amounting to 3.8 by comparison with the P.E.R. of casein of 3.2.

EXAMPLE 2

The procedure is as described in Example 1 starting with pieces of fish or small whole fish. In this case, steps are taken carefully to free the alkaline medium to be spun from its solid impurities so that centrifuging is followed by passage through candle filters.

The remaining operations are then carried out in the same way as in Example 1, fibres having similar characteristics being obtained.

EXAMPLE 3

The procedure is as described in Example 2 starting with fish scraps rich in skin, bones and heads. Centrifuging is again followed by passage through candle filters and, before extrusion, the alkaline medium is further treated with active carbon. The greyish colour of this medium lightens considerably.

The operations described above give fibres having mechanical and nutritional properties similar to those of the preceding Examples, their colour being slightly darker. The taste is pleasant and reminiscent of that of cod.

We claim:

1. A process for preparing fibres from fish proteins which comprises successively:
   (a) grounding whole fish or fish pieces in the presence of water, the water to fish ratio being 0.7:1 to 2.5:1 by weight,
   (b) adding alkali to the ground fish in an alkali to fish ratio of 0.5:1 to 1.5:1 by weight based on dry matter,
   (c) heating the alkali/fish mixture of step (b) to a temperature of 60° to 100° C. for 0.5 to 3 minutes,
   (d) cooling the mixture of step (c) to a temperature of 35° to 60° C.,
   (e) passing the cooled mixture of step (d) through a colloid mill, eliminating solid particles and optionally concentrating to obtain a protein solution having a dry matter content of 6 to 10% by weight,
   (f) injecting the alkaline solution of step (e) through a spinneret into an aqueous acid medium having a pH of 0.7 to 0.9 and an ionic strength of 2.0 to 2.2 thereby to coagulate the proteins to fibres,
   (g) washing the fibres of step (f),
   (h) setting the fibres of step (g) by heating, and
   (i) neutralising the fibres.

2. A process as claimed in claim 1, wherein the ratio by weight of water to fish is from 1.0:1 to 1.5:1.

3. A process as claimed in claim 1 or 2, wherein heating of the mixture to a temperature of from 60° to 100° C. is carried out by the injection of steam.

4. A process as claimed in claim 1, wherein before injection into the acid medium the aqueous alkaline medium has a viscosity of from 10,000 to 30,000 cps.

5. A process as claimed in claim 1, wherein before injection into the acid medium the alkaline medium is passed through filter candles.

6. A process as claimed in claim 1, wherein before injection into the aqueous acid medium or into a recycling stage the aqueous alkaline medium is treated with active carbon.

7. A process as claimed in claim 1, wherein after coagulation the fibres are washed with water to reduce their salt content to from 2 to 5% by weight, based on dry matter.

8. A process as claimed in claim 1, wherein the fibres are immersed for 10 to 15 minutes in water at 50° to 75° C.

9. A process as claimed in claim 1, wherein after coagulation the fibres of fish protein are neutralised to a pH of from 6 to 6.8.

10. Fibres of fish protein obtained by a process as claimed in claim 1.

11. Fibres as claimed in claim 10, having a P.E.R. value of about 3.8.

* * * * *

UNITED STATES PATENT AND TRADEMARK OFFICE
CERTIFICATE OF CORRECTION

PATENT NO. : 4,340,612
DATED : July 20, 1982
INVENTOR(S) : Lars Askman, Pierre Wetzel and Alain Isely It is certified that error appears in the above—identified patent and that said Letters Patent is hereby corrected as shown below:

Column 2, line 19, "as alkali" should read --an alkali--.

Column 5, claim 1, line 3, "grounding" should read --grinding--.

Signed and Sealed this

Fourteenth Day of September 1982

[SEAL]

Attest:

GERALD J. MOSSINGHOFF

Attesting Officer     Commissioner of Patents and Trademarks